O. A. ROED.
CAROUSEL.
APPLICATION FILED NOV. 8, 1912.
1,065,470.
Patented June 24, 1913.
2 SHEETS—SHEET 1.
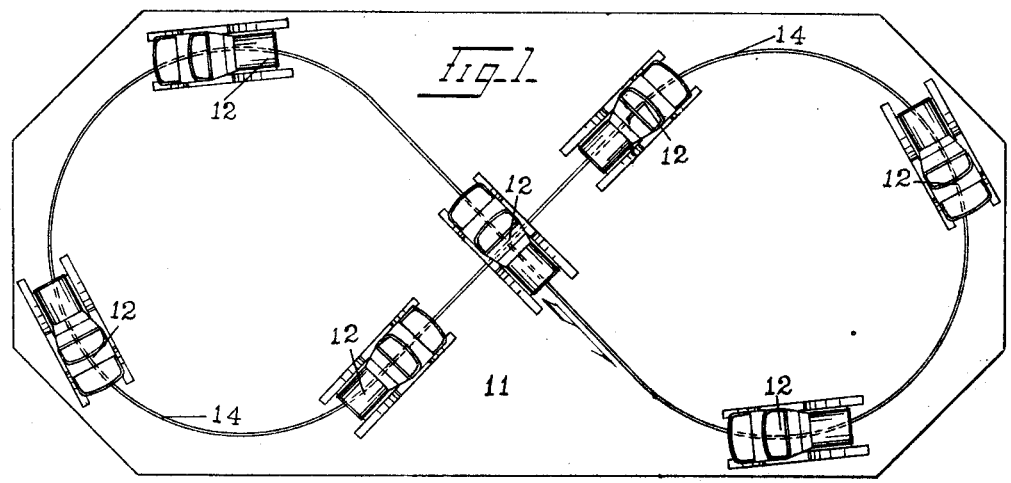
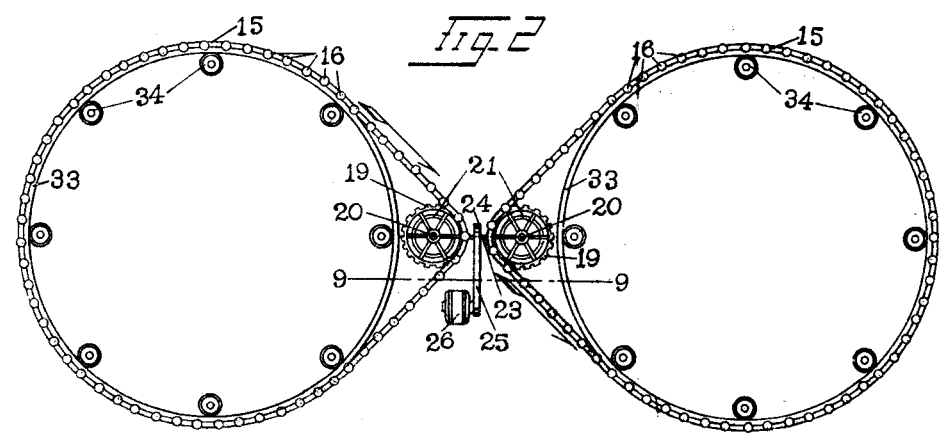
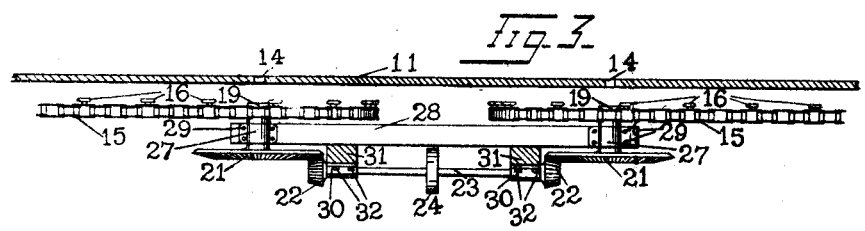
Witnesses
J. Röd
Dora Lien
Inventor
Olaf A. Roed

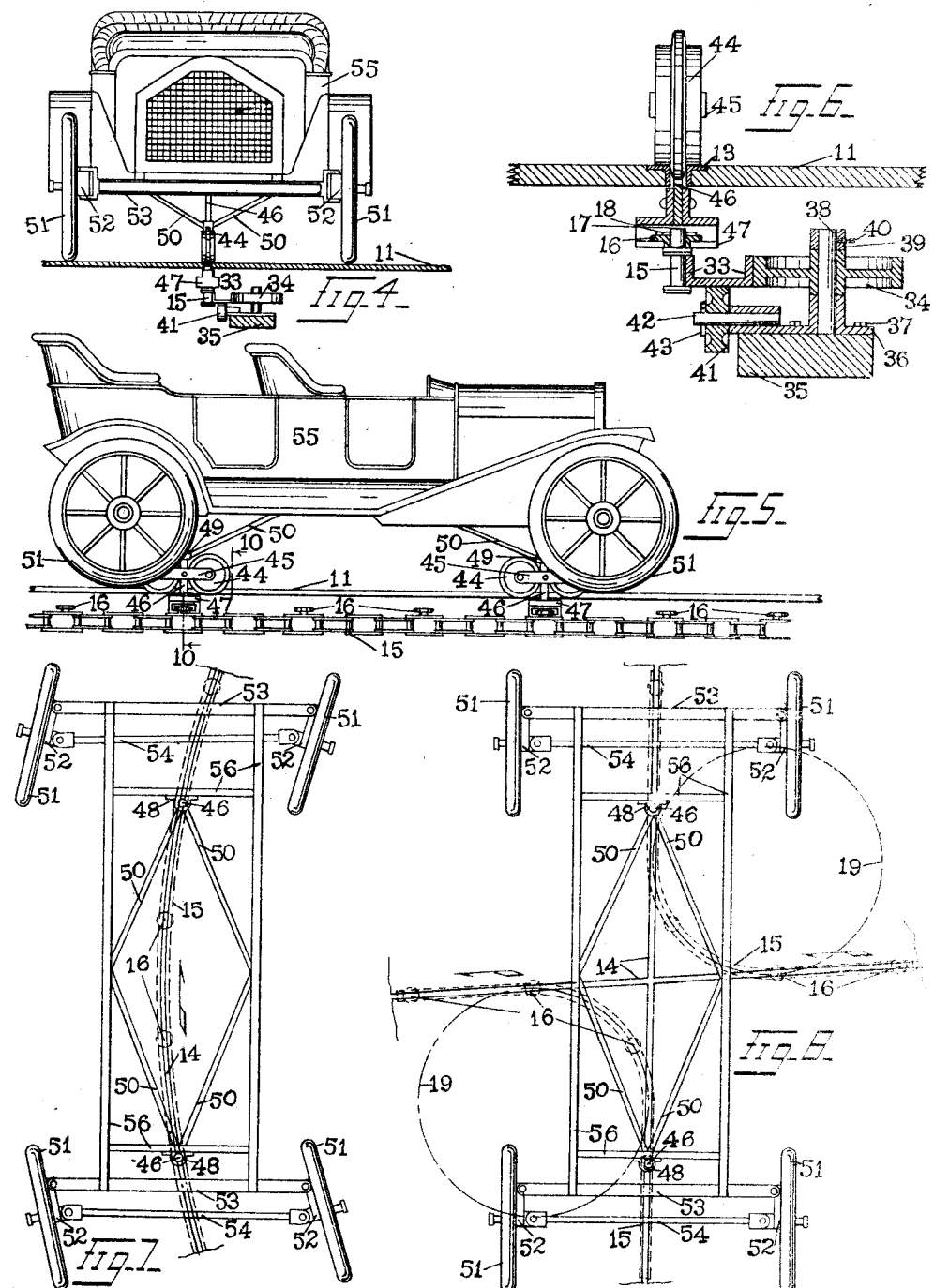

UNITED STATES PATENT OFFICE.

OLAF A. ROED, OF MINNEAPOLIS, MINNESOTA.

CAROUSEL.

1,065,470.  Specification of Letters Patent.  Patented June 24, 1913.

Application filed November 8, 1912. Serial No. 730,291.

*To all whom it may concern:*

Be it known that I, OLAF A. ROED, a citizen of the United States, residing at Minneapolis, in the county of Hennepin and State of Minnesota, have invented a certain new and useful Carousel; and I do hereby declare the following to be a full, clear, and exact description of the invention, such as will enable others skilled in the art to which it pertains to make and use the same.

The invention relates to carousels and has for its object to provide an amusement device in which passenger carriers are moved along a sinuous path which crosses and re-crosses itself at intervals, the passenger carriers being propelled by drive chains arranged in a plane beneath the supporting platform.

Generally stated, my invention consists in the employment of two or more drive chains, with means of periodically transferring the passenger carriers from one chain to another.

While, as just indicated, more than two drive chains may be employed, the greater number would, nevertheless include at least two chains, and hence, for the purpose of this description, the invention will be hereinafter described as employing two drive chains and it will be understood that changes in the specific device shown and described, may be made within the scope of the claims, without departing from the spirit of the invention.

In the accompanying drawings forming a part of this specification and in which like numerals of reference indicate corresponding parts throughout: Figure 1 represents a plan view of the device; Fig. 2 is a plan of the drive chains, the platform being removed; Fig. 3 is an enlarged elevation on line 9—9 Fig. 2; Fig. 4 is a front end elevation of the passenger carrier; Fig. 5 is a side elevation of the passenger carrier; Fig. 6 is part section and part elevation on line 10—10 Fig. 5; Fig. 7 is a plan of passenger carrier, the body being removed to show the relative position of the various parts of running gear when carrier is on a curve; and Fig. 8 is a plan of running gear as carrier is being transferred from one drive chain to another.

Referring now to the drawings in detail, 11 is the platform on which the passenger carriers 12 are operated.

14 is a sinuous guideway for directing the travel of passenger carriers and is preferably an endless slot in the supporting platform, lined with metal liners 13.

15 are the drive chains which carry a series of drive knobs 16, rotatively mounted on shafts 17 and secured by the cotter pins 18.

19 are the sprocket drive wheels, which are fixedly secured to the shafts 20, the lower ends of which are keyed to the gear wheels 21, which are arranged to engage with pinions 22, which pinions are both keyed to the shaft 23.

24 is a pulley keyed to 22 and over which passes a belt 25, that also engages the drive pulley of a motor 26.

27 are journals for the shafts 20 and are secured to the timbers 28 by the bolts 29.

30 are journals for the shaft 23 and are fastened to the timber 31 by the bolts 32.

33 are traction rings for guiding the drive chains.

34 are vertical supporting pulleys for 33 and are fastened to a suitable support 35 by the base plate 36, bolts 37, shaft 38, shaft collar 39 and set-screw 40.

41 are horizontal supporting pulleys for 33 and are rotatively secured to 36 by the shaft 42 and cotter pin 43.

The passenger carriers are guided along the slot 14 by trucks comprising two flanged wheels 44, side bars 45, stem 46 and coupling shoe 47. The stem 46 is secured to the frame 56 by the journals 48 and 49 and by the braces 50. A caster action is imparted to the wheels 51 by pivotally connecting the wheel bearings 52 to the supporting axle 53.

54 are bars for keeping the wheels parallel.

55 is the body of the passenger carrier.

In the operation of a carousel constructed substantially as shown and described, the motor 26 through the belt 25, shaft 23 and bevel gears 21 and 22, will transmit motion to the drive sprocket wheels 19; thus the two chains 15 are driven in the same direction and at the same speed. The passenger carriers, being spaced equal distances apart along the guideway, will have their coupling shoes 49 in engagement with the drive knobs 16, each passenger carrier being engaged with the drive chain or chains at two points. The slot in the coupling shoe provides sufficient clearance to allow for the shortening between drive knobs when the chain is passing the curves, (see Fig. 7.)

The direction of travel of the passenger carrier is entirely controlled by the flanged wheels 44, and the supporting wheels 51 will adapt themselves to any change in direction the same as a caster. Each coupling will be in engagement with a drive knob as long as the guideway is directly above the drive chains. As the passenger carrier approaches the crossing, the drive chain is deflected from the guideway and the drive knob is released from the forward coupling shoe. Since each passenger carrier carries two coupling shoes, the release of the forward shoe will not affect the motion of the carrier, which will carry the free shoe past the crossing and into the path of the next chain, where it will engage a drive knob before the rear coupling is released. (See Fig. 8.) Since the passenger carriers are always positively connected to the drive chains at one or more points, they will always remain the same distance apart and if properly spaced cannot collide, one with another.

It is obvious from the above description that the length of guideway will be longer than the total length of drive chains, and that for every cycle of the passenger carrier around the guideway any given coupling shoe will engage the chain at a point some distance from where engagement took place in the previous cycle; therefore, to make the device operative, it follows that the distance center to center of drive knobs, must be a common divisor of the length of guideway and of the total length of the drive chains. Also that the distance, center to center of coupling shoes, must be equal to or a multiple of the distance, center to center of drive knobs.

Having thus described my invention, what I claim as new and desire to secure by Letters Patent is:

1. The combination with a guideway passenger carriers directed by the guideway, a plurality of drive chains arranged in a plane beneath the passenger carriers, releasable connections between the passenger carriers and the drive chains, means for periodically transferring the passenger carriers from one chain to another as and for the purposes described.

2. The combination with a guideway crossing and recrossing itself at intervals, guides disposed in said guideway and connected to passenger carrier, a plurality of drive chains arranged in a plane beneath the guideway, releasable connections between the passenger carriers and the drive chains, means for periodically transferring the passenger carriers from one chain to another as and for the purposes described.

3. In a carousel, an endless, sinuous guideway, crossing and recrossing itself at intervals, passenger carriers directed by the guideway, a plurality of drive chains arranged in a plane beneath the guideway, releasable connections between the passenger carriers and the drive chains, means for periodically transferring the passenger carriers from one chain to another as and for the purposes described.

4. In a carousel, an endless guideway, crossing and recrossing itself at intervals, passenger carriers directed by said guideway, a series of drive chains arranged in a plane beneath the guideway, means for driving the chains at the same speed and in the same direction, means for periodically connecting the passenger carriers to each drive chain, comprising a plurality of attachments or coupling shoes on each passenger carrier for engagement with suitable catches on chains; the positive transfer of passenger carriers from one chain to another by the catch of one chain engaging the passenger carrier, while the preceding chain is still in engagement with said passenger carrier, substantially as described.

5. In a carousel, an endless sinuous guideway, crossing and recrossing itself at intervals, passenger carriers directed by the guideway, a plurality of drive chains arranged in a plane beneath the guideway, means for periodically connecting the passenger carriers to each drive chain, comprising a series of drive knobs or catches, equall spaced along each drive chain, the distance center to center of catches being a common divisor of the length of guideway and of the total length of the drive chains, a plurality of coupling shoes attached to the passenger carrier and adapted for engagement with the drive knobs; the distance, center to center of coupling shoes being equal to or a multiple of the distance between drive knobs; the positive transfer of passenger carriers from one chain to another by a coupling shoe engaging a drive knob of one chain while another coupling shoe of the same passenger carrier is still in engagement with a drive knob on the preceding chain, as and for the purposes described.

OLAF A. ROED.

Witnesses:
J. Röd,
Dora Lien.